US012775205B2

(12) United States Patent
Takeuchi

(10) Patent No.: US 12,775,205 B2
(45) Date of Patent: Oct. 27, 2026

(54) PROJECTION SYSTEM WITH GEOMETRIC ARRANGEMENT OF REFLECTIVE OPTICAL SYSTEMS

(71) Applicant: SEIKO EPSON CORPORATION, Tokyo (JP)

(72) Inventor: Kaho Takeuchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 355 days.

(21) Appl. No.: 18/518,822

(22) Filed: Nov. 24, 2023

(65) Prior Publication Data

US 2024/0176221 A1 May 30, 2024

(30) Foreign Application Priority Data

Nov. 25, 2022 (JP) ................................ 2022-188386

(51) Int. Cl.
*G03B 21/28* (2006.01)

(52) U.S. Cl.
CPC .................................... *G03B 21/28* (2013.01)

(58) Field of Classification Search
CPC ...................................................... G03B 21/28
See application file for complete search history.

(56) References Cited

U.S. PATENT DOCUMENTS 8,419,191 B2 4/2013 Nagase et al.
10,466,452 B2 11/2019 Minefuji
2003/0090794 A1* 5/2003 Chatani .................. G03B 21/56 359/449
2004/0027662 A1* 2/2004 Kurioka ............. G02B 17/0832 359/449
2004/0156117 A1* 8/2004 Takaura ............. G02B 17/0816 359/651
2004/0174611 A1* 9/2004 Hatakeyama ...... G02B 17/0852 359/676
2004/0184009 A1* 9/2004 Hatakeyama ........ H04N 9/3141 348/E5.143

(Continued)

FOREIGN PATENT DOCUMENTS

JP 2001-215412 A 8/2001
JP 2007-10787 A 1/2007

(Continued)

*Primary Examiner* — Bao-Luan Q Le
(74) *Attorney, Agent, or Firm* — Oliff PLC

(57) ABSTRACT

A projection system includes a first optical system and a second optical system sequentially arranged from the reduction side toward the enlargement side, the first optical system formed of a plurality of lenses. The first reflective optical system has a first reflection surface having a concave aspherical shape. The second reflective optical system has a second reflection surface having a concave shape or a planar shape. The third reflective optical system has a third reflection surface having a convex aspherical shape. At least two of the first, second, and third reflection surfaces each have an aspherical shape. The projection system satisfies Conditional Expression (1) below $$|f2|>|f1|>|f3| \quad (1)$$

where f1 represents the focal length of the first reflective optical system, f2 represents the focal length of the second reflective optical system, and f3 represents the focal length of the third reflective optical system.

8 Claims, 8 Drawing Sheets

(56) References Cited

U.S. PATENT DOCUMENTS

| | | | | |
|---|---|---|---|---|
| 2005/0280778 | A1* | 12/2005 | Kurioka | G03B 21/28<br>348/E9.027 |
| 2006/0066760 | A1* | 3/2006 | Cho | G03B 21/10<br>348/E9.027 |
| 2006/0221307 | A1* | 10/2006 | Imaoka | G03B 21/28<br>353/78 |
| 2007/0002284 | A1* | 1/2007 | Imaoka | G03B 21/145<br>353/78 |
| 2007/0184368 | A1* | 8/2007 | Nishikawa | G03B 21/10<br>430/30 |
| 2007/0195290 | A1* | 8/2007 | Ohzawa | G03B 21/28<br>353/99 |
| 2008/0055899 | A1* | 3/2008 | Tsuyuki | G02B 27/0172<br>362/253 |
| 2009/0168031 | A1* | 7/2009 | Imaoka | G02B 13/16<br>353/99 |
| 2010/0002321 | A1* | 1/2010 | Seki | G03B 21/28<br>359/651 |
| 2010/0208364 | A1* | 8/2010 | Minefuji | G02B 17/0816<br>359/731 |
| 2018/0246302 | A1* | 8/2018 | Minefuji | G02B 17/08 |
| 2019/0094670 | A1* | 3/2019 | Takahashi | G02B 17/0816 |
| 2019/0107696 | A1* | 4/2019 | Kano | G02B 13/16 |
| 2019/0222728 | A1* | 7/2019 | Aoki | H04N 23/54 |
| 2020/0033570 | A1* | 1/2020 | Amano | G03B 21/142 |
| 2020/0142291 | A1* | 5/2020 | Nishikawa | G03B 21/28 |
| 2020/0166737 | A1* | 5/2020 | Amano | G02B 17/0816 |

FOREIGN PATENT DOCUMENTS

| | | | |
|---|---|---|---|
| JP | 2008-250296 | A | 10/2008 |
| JP | 2017-040849 | A | 2/2017 |

* cited by examiner

PROJECTION SYSTEM WITH GEOMETRIC ARRANGEMENT OF REFLECTIVE OPTICAL SYSTEMS

The present application is based on, and claims priority from JP Application Serial Number 2022-188386, filed Nov. 25, 2022, the disclosure of which is hereby incorporated by reference herein in its entirety.

BACKGROUND

1. Technical Field

The present disclosure relates to a projection system and a projector.

2. Related Art

JP-A-2017-040849 describes a projector in which a projection system enlarges a projection image displayed at an image display device and projects the enlarged projection image onto a screen. The projection system includes a refractive optical system and a reflective optical system sequentially arranged from the reduction side toward the enlargement side. The refractive optical system includes a plurality of refractive lenses. The reflective optical system includes a first reflective optical system, a second reflective optical system, and a third reflective optical system sequentially provided from the side facing the refractive optical system along the optical path of the beams output from the refractive optical system. The first reflective optical system has a first reflection surface having a concave shape. The second reflective optical system has a second reflection surface having a curved shape. The third reflective optical system has a third reflection surface having a convex shape. The absolute value of the focal length of the third reflective optical system is greater than the absolute value of the focal length of the first reflective optical system. The projection system described in JP-A-2017-040849 has a projection distance of about 372 mm at the shortest.

JP-A-2017-040849 is an example of the related art.

There is a demand for a projection system having a shorter projection distance.

SUMMARY

To meet the demand described above, a projection system according to an aspect of the present disclosure includes a first optical system and a second optical system sequentially from a reduction side toward an enlargement side, the first optical system formed of a plurality of lenses, the first optical system having positive power, the second optical system including a first reflective optical system, a second reflective optical system, and a third reflective optical system sequentially arranged from a side facing the first optical system along an optical path of beams output from the first optical system, the first reflective optical system having a first reflection surface having a concave aspherical shape, the second reflective optical system having a second reflection surface having a concave shape or a planar shape, the third reflective optical system having a third reflection surface having a convex aspherical shape, and the projection system satisfying Conditional Expression (1) below $$|f2|>|f1|>|f3| \quad (1)$$

where f1 represents a focal length of the first reflective optical system, f2 represents a focal length of the second reflective optical system, and f3 represents a focal length of the third reflective optical system.

A projector according to another aspect of the present disclosure includes the projection system described above, and an image formation unit that forms a projection image in a reduction-side conjugate plane of the projection system.

DESCRIPTION OF EMBODIMENTS

An optical system and a projector according to an embodiment of the present disclosure will be described below with reference to the drawings.

Projector

Figure 1:
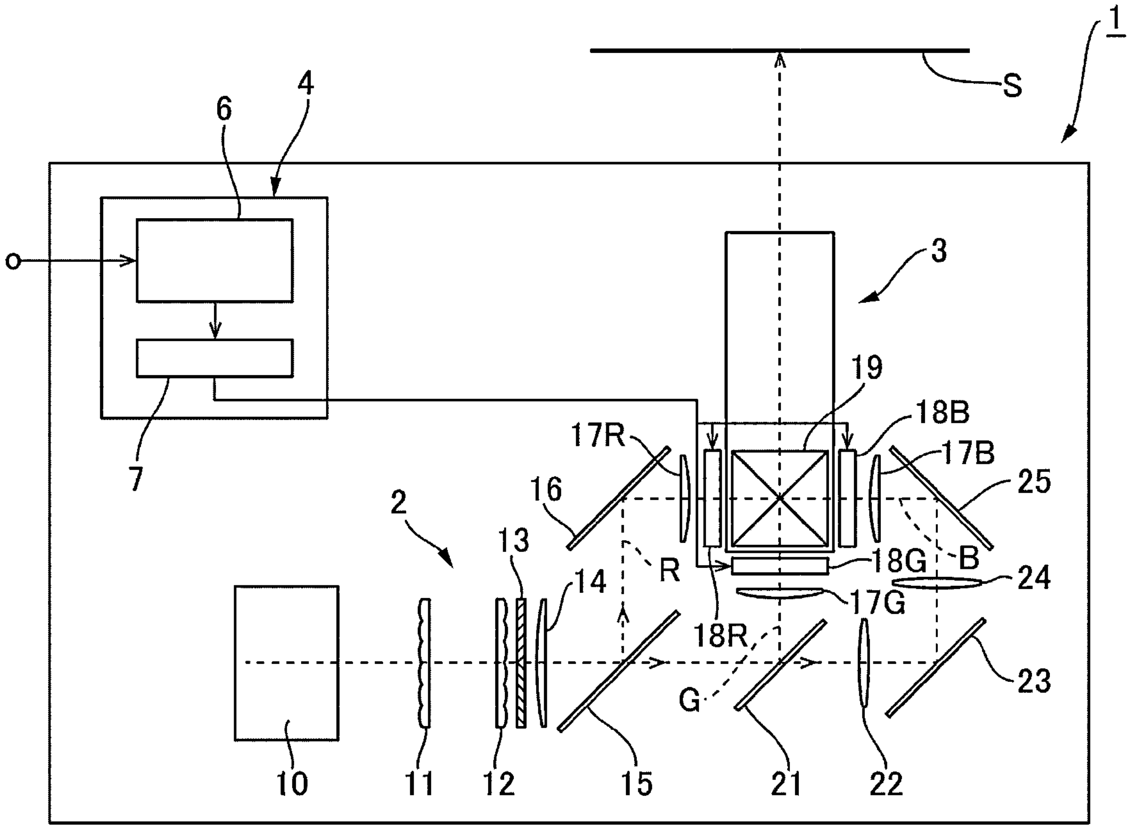
FIG. 1 shows a schematic configuration of a projector including a projection system according to an embodiment of the present disclosure.

FIG. 1 shows a schematic configuration of a projector including a projection system 3 according to the embodiment of the present disclosure. A projector 1 includes an image formation unit 2, which generates a projection image to be projected onto a screen S, the projection system 3, which enlarges the projection image and projects the enlarged image onto the screen S, and a controller 4, which controls the operation of the image formation unit 2, as shown in FIG. 1.

Image Formation Unit and Controller

The image formation unit 2 includes a light source 10, a first optical integration lens 11, a second optical integration lens 12, a polarization converter 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides a luminous flux from the light source 10 into a plurality of luminous fluxes. The lens elements of the first optical integration lens 11 bring the luminous flux from the light source 10 into focus in the vicinity of the lens elements of the second optical integration lens 12.

The polarization converter 13 converts the light via the second optical integration lens 12 into predetermined linearly polarized light. The superimposing lens 14 superimposes images of the lens elements of the first optical integration lens 11 on one another in a display region of each of liquid crystal panels 18R, 18G, and 18B, which will be described later, via the second optical integration lens 12.

The image formation unit 2 further includes a first dichroic mirror 15, a reflection mirror 16, a field lens 17R, and the liquid crystal panel 18R. The first dichroic mirror 15 reflects R light, which is part of the beam incident via the superimposing lens 14, and transmits G light and B light, which are part of the beam incident via the superimposing lens 14. The R light reflected off the first dichroic mirror 15 travels via the reflection mirror 16 and the field lens 17R and is incident on the liquid crystal panel 18R. The liquid crystal panel 18R is an image formation device. The liquid crystal panel 18R modulates the R light in accordance with an image signal to form a red projection image.

The image formation unit 2 further includes a second dichroic mirror 21, a field lens 17G, and the liquid crystal panel 18G. The second dichroic mirror 21 reflects the G light, which is part of the beam via the first dichroic mirror 15, and transmits the B light, which is part of the beam via the first dichroic mirror 15. The G light reflected off the second dichroic mirror 21 passes through the field lens 17G and is incident on the liquid crystal panel 18G. The liquid crystal panel 18G is an image formation device. The liquid crystal panel 18G modulates the G light in accordance with an image signal to form a green projection image.

The image formation unit 2 further includes a relay lens 22, a reflection mirror 23, a relay lens 24, a reflection mirror 25, a field lens 17B, the liquid crystal panel 18B, and a cross dichroic prism 19. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is an image formation device. The liquid crystal panel 18B modulates the B light in accordance with an image signal to form a blue projection image.

The liquid crystal panels 18R, 18G, and 18B surround the cross dichroic prism 19 in such a way that the liquid crystal panels 18R, 18G, and 18B face three sides of the cross dichroic prism 19. The cross dichroic prism 19, which is a prism for light combination, produces a projection image that is the combination of the light modulated by the liquid crystal panel 18R, the light modulated by the liquid crystal panel 18G, and the light modulated by the liquid crystal panel 18B.

The projection system 3 enlarges the combined projection image from the cross dichroic prism 19 and projects the enlarged projection image onto the screen S.

The controller 4 includes an image processor 6, to which an external image signal, such as a video signal, is input, and a display driver 7, which drives the liquid crystal panels 18R, 18G, and 18B based on image signals output from the image processor 6.

The image processor 6 converts an image signal input from an external apparatus into image signals each containing grayscales and other factors of the corresponding color. The display driver 7 operates the liquid crystal panels 18R, 18G, and 18B based on the color projection image signals output from the image processor 6. The image processor 6 thus causes the liquid crystal panels 18R, 18G, and 18B to display projection images corresponding to the image signals.

Projection System

Figure 2:
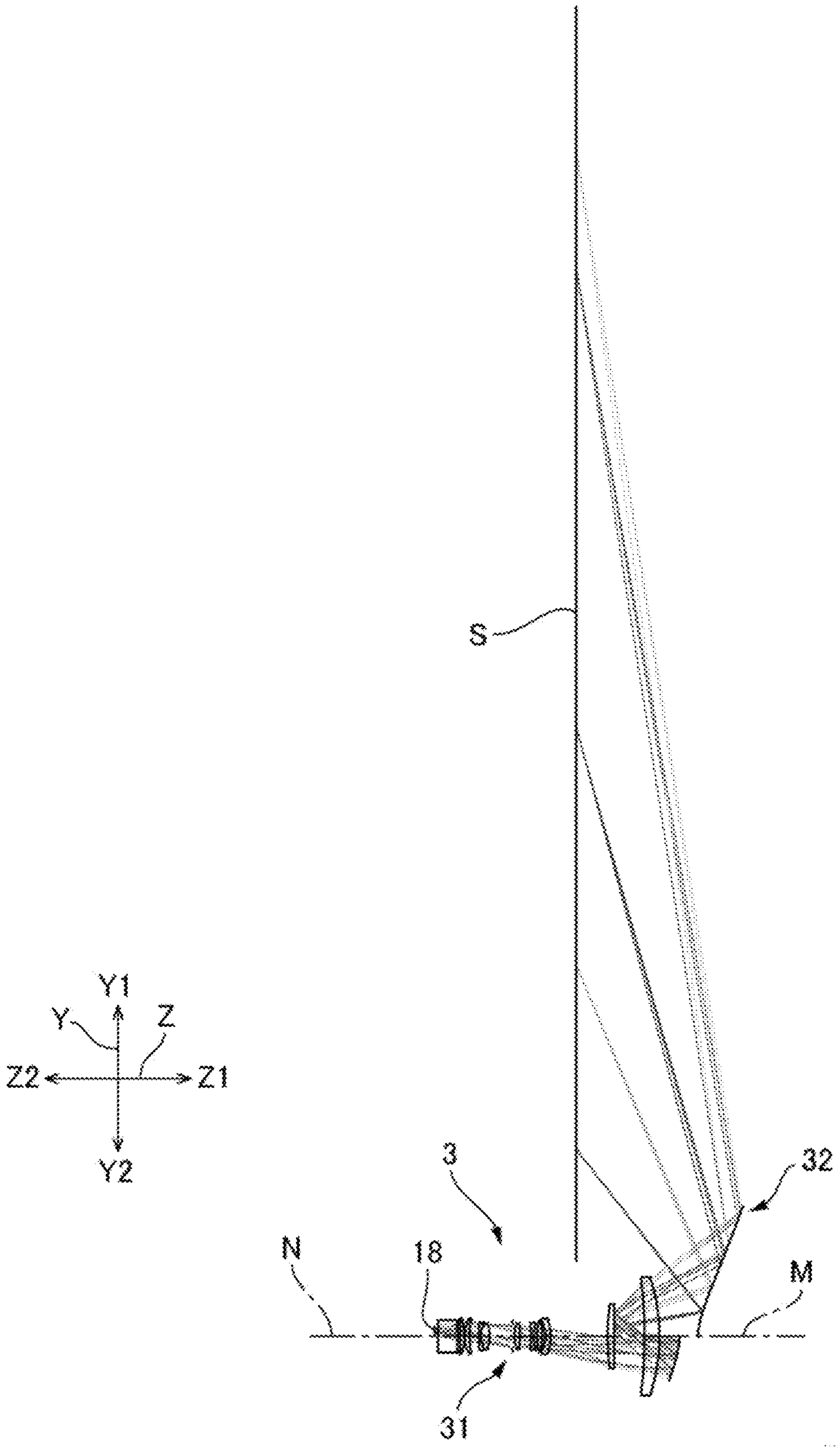
FIG. 2 is a beam diagram showing beams passing through the projection system.

The projection system 3 will next be described. FIG. 2 is a beam diagram showing beams passing through the projection system 3. In FIG. 2, the liquid crystal panels 18R, 18G, and 18B are drawn as a liquid crystal panel 18. The screen S is disposed in the enlargement-side conjugate plane of the projection system 3, as shown in FIG. 2. The liquid crystal panel 18 is disposed in the reduction-side conjugate plane of the projection system 3.

In the following description, three axes perpendicular to one another are called axes X, Y, and Z for convenience. The direction along a first optical axis N of the projection system 3 is called an axis-Z direction. The axis-Z direction toward the side opposite from the side where the liquid crystal panel 18 is located is called a first direction Z1, and the axis-Z direction toward the side where the liquid crystal panel 18 is located is called a second direction 22. The axis Y extends along the screen S. The upward-downward direction is an axis-Y direction, with one side of the axis-Y direction called an upper side Y1 and the other side of the axis-Y direction called a lower side Y2. The axis X extends in the width direction of the screen.

Examples 1 to 3 will be described below as examples of the configuration of the projection system 3 incorporated in the projector 1.

Example 1

Figure 3:
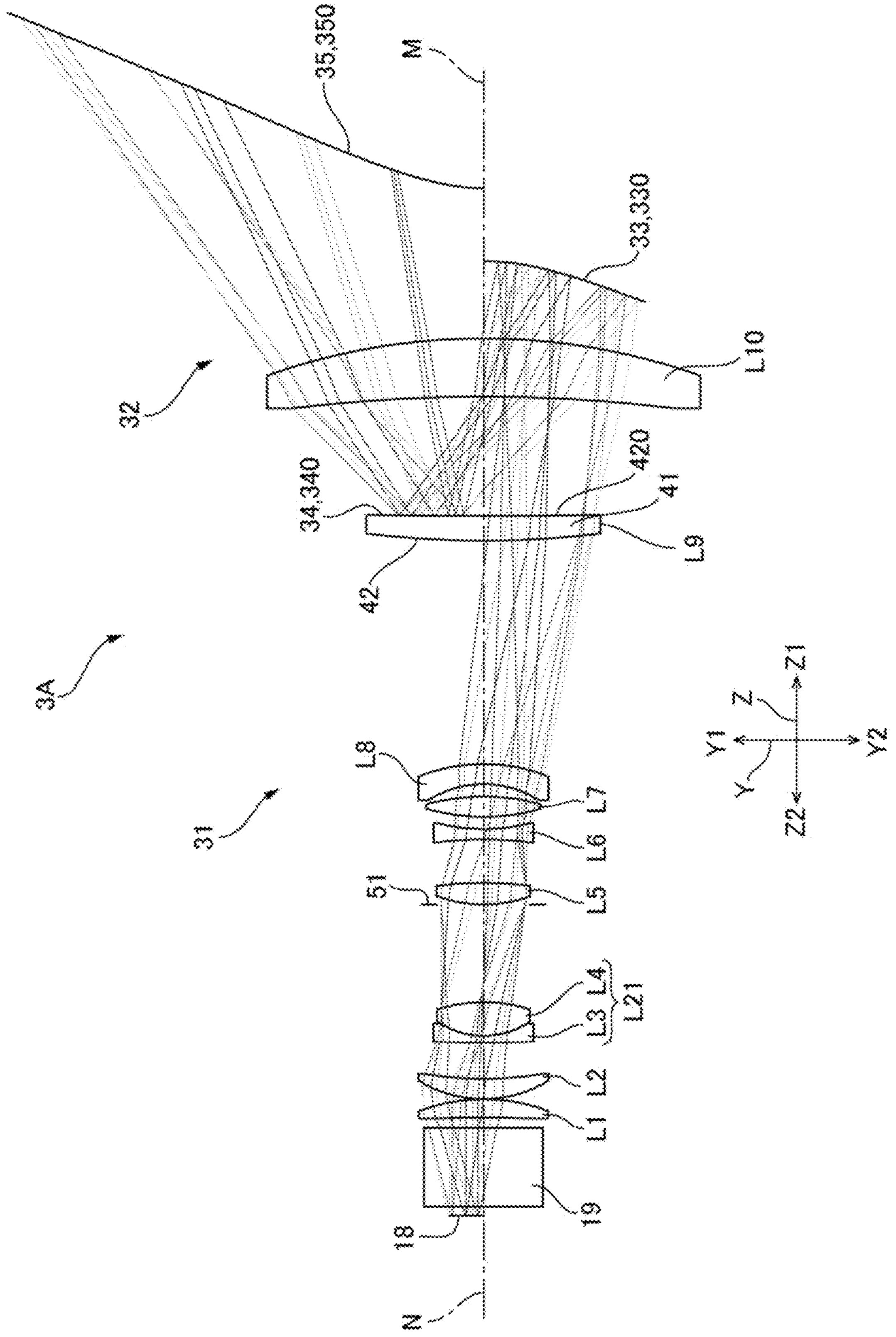
FIG. 3 is a beam diagram showing beams passing through the projection system according to Example 1.

FIG. 3 is a beam diagram showing beams passing through a projection system 3A according to Example 1. The projection system 3A is formed of a first optical system 31 and a second optical system 32 sequentially arranged from the reduction side toward the enlargement side, as shown in FIG. 3. The first optical axis N of the first optical system 31 coincides with the second optical axis M of the second optical system 32.

The first optical system 31 is a refractive optical system having positive power. The first optical system 31 is formed of a plurality of lenses. Specifically, the first optical system 31 is formed of ten lenses L1 to L10. The lenses L1 to L10 are arranged in this order from the reduction side toward the enlargement side. A diaphragm 51 is disposed between the lens L4 and the lens L5.

The lens L1 has positive power. The lens L1 is a meniscus lens. The lens L1 has a concave surface at the reduction side and a convex surface at the enlargement side. The lens L2 has positive power. The lens L2 is a meniscus lens. The lens L2 has a convex surface at the reduction side and a concave surface at the enlargement side.

The lens L3 has negative power. The lens L3 has a convex surface at the reduction side and a concave surface at the enlargement side. The lens L4 has negative power. The lens L4 has convex surfaces both at the reduction and enlargement sides. The lenses L3 and L4 are bonded to each other into a cemented doublet L21.

The lens L5 has positive power. The lens L5 has convex surfaces both at the reduction and enlargement sides. The lens L6 has negative power. The lens L6 has concave surfaces both at the reduction and enlargement sides. The lens L7 has positive power. The lens L7 has convex surfaces both at the reduction and enlargement sides. The lens L8 has negative power. The lens L8 is a meniscus lens. The lens L8 has a concave surface at the reduction side and a convex surface at the enlargement side.

The lens L9 (second lens) has positive power. The lens L9 is a meniscus lens. The lens L9 has a convex surface at the reduction side and a concave surface at the enlargement side. The lens L9 has a first portion 41 on one side of the first optical axis N and a second portion 42 on the other side thereof. The first portion 41 is a light transmissive portion that functions as part of the first optical system 31. More specifically, the first portion 41 is a light transmissive portion that functions as a refractive lens of the first optical system 31. The second portion 42 is a reflective portion that functions as a second reflection surface 340, which will be described later.

The lens L10 (first lens) has positive power. The lens L10 is a meniscus lens. The lens L10 has a concave surface at the reduction side and a convex surface at the enlargement side. The plurality of lenses L1 to L10, which constitute the first optical system 31, each have a shape rotationally symmetric with respect to the first optical axis N of the first optical system 31 as the axis of rotation.

The second optical system 32 includes a first reflective optical system 33, a second reflective optical system 34, and a third reflective optical system 35, which are sequentially arranged from the side facing the first optical system 31 along the optical path of the beams output from the first optical system 31. The lens L10 is disposed between the first reflective optical system 33 and the second reflective optical system 34 and between the second reflective optical system 34 and the third reflective optical system 35 in the first direction Z1.

The first reflective optical system 33 is disposed at the enlargement side of the first optical system 31. The first reflective optical system 33 is located at the lower side Y2 of the second optical axis M. The first reflective optical system 33 has a first reflection surface 330 having a concave shape. The first reflection surface 330 has an aspherical shape.

The second reflective optical system 34 is disposed on the optical path at the enlargement side of the first reflective optical system 33. The second reflective optical system 34 is located at the upper side Y1 of the second optical axis M. The second reflective optical system 34 has the second reflection surface 340 having a concave shape. The second reflection surface 340 is provided at t an enlargement-side lens surface 420 of the second portion 42 of the lens L9. The second reflection surface 340 is formed of a reflective coating layer provided at the enlargement-side lens surface 420 of the second portion 42.

The third reflective optical system 35 is disposed on the optical path at the enlargement side of the second reflective optical system 34. The third reflective optical system 35 is located at the upper side Y1 of the second optical axis M. The third reflective optical system 35 has a third reflection surface 350 having a convex shape. The third reflection surface 350 has an aspherical shape.

The first reflection surface 330, the second reflection surface 340, and the third reflection surface 350, which constitute the second optical system 32, each have a shape rotationally symmetric with respect to the second optical axis M of the second optical system 32 as the axis of rotation.

The liquid crystal panel 18 forms a projection image in an image formation plane perpendicular to the first optical axis N of the first optical system 31. The liquid crystal panel 18 is disposed in a position offset from the first optical axis N of the first optical system 31 toward the upper side Y1. The beams from the liquid crystal panel 18 pass through the first optical system 31 and the second optical system 32 in this order. Between the first optical system 31 and the second optical system 32, the beams pass through the lower side Y2 of the first optical axis N toward the first reflection surface 330 of the second optical system 32.

The beams having reached the first reflection surface 330 are reflected off the first reflection surface 330 and travels across the first optical axis N toward the upper side Y1 and then in the second direction Z2 and towards the upper side Y1. The beams reflected off the first reflection surface 330 pass through the lens L10 and reach the second reflection surface 340. The beams having reached the second reflection surface 340 are reflected in the first direction Z1 and towards the upper side Y1. The beams reflected off the second reflection surface 340 pass through the lens L10 and reach the third reflection surface 350. The beams having reached the third reflection surface 350 are reflected in the second direction Z2 and towards the upper side Y1. The beams reflected off the third reflection surface 350 are enlarged by the third reflection surface 350 and reach the screen S.

Let FNo be the f number of the projection system 3A, and ω be the maximum half angle of view of the entire lens system, and data on the projection system 3A according to Example 1 are as follows:

| | |
|---|---|
| Fno | 1.431 |
| ω | 80.143° |

Data on the lenses of the projection system 3A are listed below. The surfaces of the lenses are numbered sequentially from the reduction side toward the enlargement side. Reference characters are given to the liquid crystal panels, the dichroic prism, the lenses, the first reflection surface, the second reflection surface, the third reflection surface, and the screen. Reference character R represents the radius of curvature. Reference character D represents the axial inter-surface spacing. Reference character nd represents the refractive index. Reference character νd represents the Abbe number. Reference character Y represents the effective radius. Reference characters R, D, and Y are each expressed in millimeters.

| Reference character | Surface number | R | D | nd | νd | Mode | Y |
|---|---|---|---|---|---|---|---|
| 18 | 0 | 0.00000 | 3.000000 | | | Refraction | |
| 19 | 1 | 0.00000 | 25.750000 | 1.516330 | 64.14 | Refraction | 11.623 |
| | 2 | 0.00000 | 3.306682 | | | Refraction | 17.017 |
| L01 | 3 | −528.38781 | 6.000000 | 1.986125 | 16.48 | Refraction | 18.000 |
| | 4 | −53.59618 | 0.100000 | | | Refraction | 18.528 |
| L02 | 5 | 36.16025 | 6.593978 | 1.913041 | 28.20 | Refraction | 18.724 |
| | 6 | 102.64785 | 11.898469 | | | Refraction | 17.948 |
| L03 | 7 | 360.09349 | 2.303687 | 1.986125 | 16.48 | Refraction | 14.285 |
| L04 | 8 | 23.69596 | 10.970660 | 1.486555 | 77.12 | Refraction | 13.162 |
| | 9 | −43.41655 | 31.906933 | | | Refraction | 13.000 |
| 51, L05 | 10 | 39.61222 | 7.000000 | 1.611109 | 57.56 | Refraction | 13.000 |
| | 11 | −110.42307 | 14.196605 | | | Refraction | 13.255 |
| L06 | 12 | −107.62425 | 3.384629 | 1.917513 | 26.94 | Refraction | 13.659 |
| | 13 | 52.74696 | 4.002725 | | | Refraction | 14.130 |
| L07 | 14 | 59.79382 | 6.739074 | 1.797855 | 19.51 | Refraction | 16.172 |
| | 15 | −64.89773 | 4.086216 | | | Refraction | 16.409 |
| L08 | 16 | −29.85440 | 6.547540 | 1.938332 | 22.41 | Refraction | 16.368 |
| | 17 | −50.82914 | 72.919770 | | | Refraction | 18.646 |

-continued

| Reference character | Surface number | R | D | nd | νd | Mode | Y |
|---|---|---|---|---|---|---|---|
| L09 | 18 | 275.26448 | 8.000000 | 1.849076 | 37.72 | Refraction | 33.805 |
| | 19 | 1396.48188 | 38.982077 | | | Refraction | 34.085 |
| L10 | 20 | −448.48764 | 19.000000 | 1.637611 | 55.29 | Refraction | 42.321 |
| | 21 | −187.55816 | 25.392163 | | | Refraction | 45.024 |
| 330 | 22* | −64.43464 | −25.392163 | | | Reflection | 47.385 |
| L10 | 23 | −187.55816 | −19.000000 | 1.637611 | 55.29 | Refraction | 36.208 |
| | 24 | −448.48764 | −38.982077 | | | Refraction | 28.586 |
| 340 | 25 | 1396.48188 | 38.982077 | | | Reflection | 26.127 |
| L10 | 26 | −448.48764 | 19.000000 | 1.637611 | 55.29 | Refraction | 57.938 |
| | 27 | −187.55816 | 49.210956 | | | Refraction | 64.005 |
| 350 | 28* | 53.46671 | −155.000000 | | | Reflection | 142.233 |
| S | 29 | 0.00000 | 0.000000 | | | Refraction | 1330.358 |

The aspherical coefficients are listed below.

| | | |
|---|---|---|
| Conic constant | 1.051849E−01 | −4.789571E+00 |
| Fourth-order coefficient | 2.049492E−06 | −2.943985E−08 |
| Sixth-order coefficient | −4.12751E−10 | 1.922612E−12 |
| Eighth-order coefficient | 2.052322E−13 | −8.387132E−17 |
| Tenth-order coefficient | −5.492764E−17 | 2.160308E−21 |
| Twelfth-order coefficient | 8.652296E−21 | −2.42962E−26 |

Let f1 be the focal length of the first reflection surface 330 of the first reflective optical system 33, f2 be the focal length of the second reflection surface 340 of the second reflective optical system 34, and f3 be the focal length of the third reflection surface 350 of the third reflective optical system 35, and data on the projection system 3A according to Example 1 are as follows:

| | |
|---|---|
| f1 | 32.217 mm |
| f2 | 698.241 mm |
| f3 | −26.733 mm |

The projection distance of the projection system 3A according to Example 1 is as follows:

Projection distance 155.000 mm

When the focal length of the first reflective optical system is f1, the focal length of the second reflective optical system is f2, and the focal length of the third reflective optical system is f3, the projection system 3A according to the present example satisfies Conditional Expression (1) below.

$$|f2|>|f1|>|f3| \quad (1)$$

In the present example,

| | |
|---|---|
| \|f1\| | 32.217 mm |
| \|f2\| | 698.241 mm |
| \|f3\| | 26.733 mm |

are satisfied. The projection system 3A according to the present example therefore satisfies Conditional Expression (1).

Effects and Advantages

The projection system 3A according to the present example, which satisfies Conditional Expression (1), can have a short projection distance. That is, employing the configuration in which the absolute value of the focal length f3 of the third reflection surface 350 is smaller than the absolute value of the focal length f1 of the first reflection surface 330 and the absolute value of the focal length f2 of the second reflection surface 340 allows a large increase in the angle of view of the beams reflected off the third reflection surface 350. The projection distance of the projection system 3A can thus be shortened.

Employing the configuration in which the absolute value of the focal length f2 of the second reflection surface 340 is greater than the absolute value of the focal length f1 of the first reflection surface 330 readily increases the angle of the beams reflected off the second reflection surface 340. The third reflection surface 350 thus readily widens the angle of reflection of the beams reflected off the third reflection surface 350 and directed toward the screen S. If the absolute value of the focal length f2 of the second reflection surface 340 is smaller than the absolute value of the focal length f1 of the first reflection surface 330, the angle of the beams reflected off the second reflection surface 340 decreases, so that it difficult for the third reflection surface 350 to widen the angle of view of the beams reflected off the third reflection surface 350 and directed toward the screen S. It is therefore not preferable to employ the configuration in which the absolute value of the focal length f2 of the second reflection surface 340 is smaller than the absolute value of the focal length f1 of the first reflection surface 330 because the projection system 3A projects a smaller enlarged image onto the screen S at a fixed projection distance as compared with the configuration in which the absolute value of the focal length f2 of the second reflection surface 340 is greater than the focal length f1 of the first reflection surface 330.

Furthermore, employing the configuration in which the absolute value of the focal length f2 of the second reflection surface 340 is greater than the absolute value of the focal length f1 of the first reflection surface 330 and the absolute value of the focal length f3 of the third reflection surface 350, that is, reducing the power of the second reflection surface 340 allows the positive power of the first reflection surface 330 and the negative power of the third reflection surface 350 to be set in a well-balanced manner. A variety of aberrations can thus be corrected in a well-balanced manner.

Example 6 described in JP-A-2017-040849, which is the related art, will now be examined as Comparative Example. The focal length f1 of the first reflective optical system, the focal length f2 of the second reflective optical system, the focal length f3 of the third reflective optical system, the absolute value of the focal length f1 of the first reflective optical system, the absolute value of the focal length f2 of the second reflective optical system, the absolute value of the focal length f3 of the third reflective optical system, the projection distance, and the maximum half angle of view ω of the entire lens system in Comparative Example are as follows:

| | |
|---|---|
| f1 | 29.281 mm |
| f2 | 102.500 mm |
| f3 | −41.225 mm |
| \|f1\| | 29.281 mm |
| \|f2\| | 102.500 mm |
| \|f3\| | 41.225 mm |
| Projection distance | 371.837 mm |
| ω | 70.2° |

The projection system according to Comparative Example, which does not satisfy Conditional Expression (1), therefore has a projection distance longer than that of the projection system 3A according to the present example. Furthermore, the projection system according to Comparative Example has a maximum half angle of view smaller than that of the projection system 3A according to the present example.

In the present example, the maximum effective radius of the third reflection surface 350 is smaller than 150 mm. When the maximum effective radius of the third reflection surface 350 is greater than or equal to 150 mm, the third reflection surface 350 tends to be distorted or bent when the third reflection surface 350 is manufactured, and it is therefore difficult to process the third reflection surface 350 with increased processing precision. Therefore, in the present example, in which the maximum effective radius of the third reflection surface 350 is smaller than 150 mm, the third reflection surface 350 can be processed with increased processing precision. The projection system 3A can thus project a sharp enlarged image onto the screen S.

In the present example, the plurality of lenses include the lens L10 having positive power and disposed at a position closest to the enlargement side. The lens L10 is disposed between the first reflection surface 330 and the second reflection surface 340 in the first direction Z1 along the first optical axis N of the first optical system 31. The beams reflected off the first reflection surface 330 pass through the lens L10 and reach the second reflection surface 340. The beams reflected off the first reflection surface 330 can therefore be controlled by the lens L10 in terms of the amount of spread of the beams and the magnitude of the angle thereof, so that the axial inter-surface spacing between the first reflection surface 330 and the second reflection surface 340 can be reduced. Furthermore, the lens L10 can satisfactorily correct the variety of aberrations that affect the beams reflected off the first reflection surface 330.

In the present example, the lens L10 is disposed between the second reflection surface 340 and the third reflection surface 350 in the first direction Z1. The beams reflected off the second reflection surface 340 pass through the lens L10 and reach the third reflection surface 350. The beams reflected off the second reflection surface 340 can therefore be controlled by the lens L10 in terms of the amount of spread of the beams and the magnitude of the angle thereof, so that the axial inter-surface spacing between the second reflection surface 340 and the third reflection surface 350 can be reduced. Furthermore, the lens L10 can satisfactorily correct the variety of aberrations that affect the beams reflected off the second reflection surface 340.

The plurality of lenses include the lens L9 disposed on the reduction side of the lens L10. The lens L9 has the first portion 41 on one side of the first optical axis N and the second portion 42 on the other side thereof. The first portion 41 is a light transmissive portion that functions a refractive lens of the first optical system. The second portion 42 is a reflective portion that functions as the second reflection surface 340. The lens L9 therefore functions both as a refractive lens and the second reflection surface 340, so that the number of optical parts can be reduced, and the configuration of the projection system 3A can be simplified.

In the present example, the first reflection surface 330 has a concave, aspherical shape. The third reflection surface 350 has a convex, aspherical shape. Since the first reflection surface 330 and the third reflection surface 350 each have power greater than that of the second reflection surface 340, the beams reflected off the first reflection surface 330 and the third reflection surface 350 are likely to be affected by the variety of aberrations as compared with the beams reflected off the second reflection surface 340. The first reflection surface 330 and the third reflection surface 350, which each have an aspherical shape, can therefore satisfactorily correct the variety of aberrations produced in the projection system 3A.

In the present example, the plurality of lenses L1 to L10 each have a shape rotationally symmetric with respect to the first optical axis N as the axis of rotation. The lenses of the first optical system 31 are therefore each readily manufactured. Furthermore, the lenses of the first optical system 31 are each readily placed with precision.

In the present example, the first reflection surface 330, the second reflection surface 340, and the third reflection surface 350 each have a shape rotationally symmetric with respect to the second optical axis Mas the axis of rotation. The reflection surfaces of the second optical system 32 are therefore each readily manufactured. Furthermore, the reflection surfaces of the second optical system 32 are each readily placed with precision.

In the present example, the first optical axis N and the second optical axis M coincide with each other. The first optical system 31 and the second optical system 32 are therefore readily placed with precision.

Figure 4:
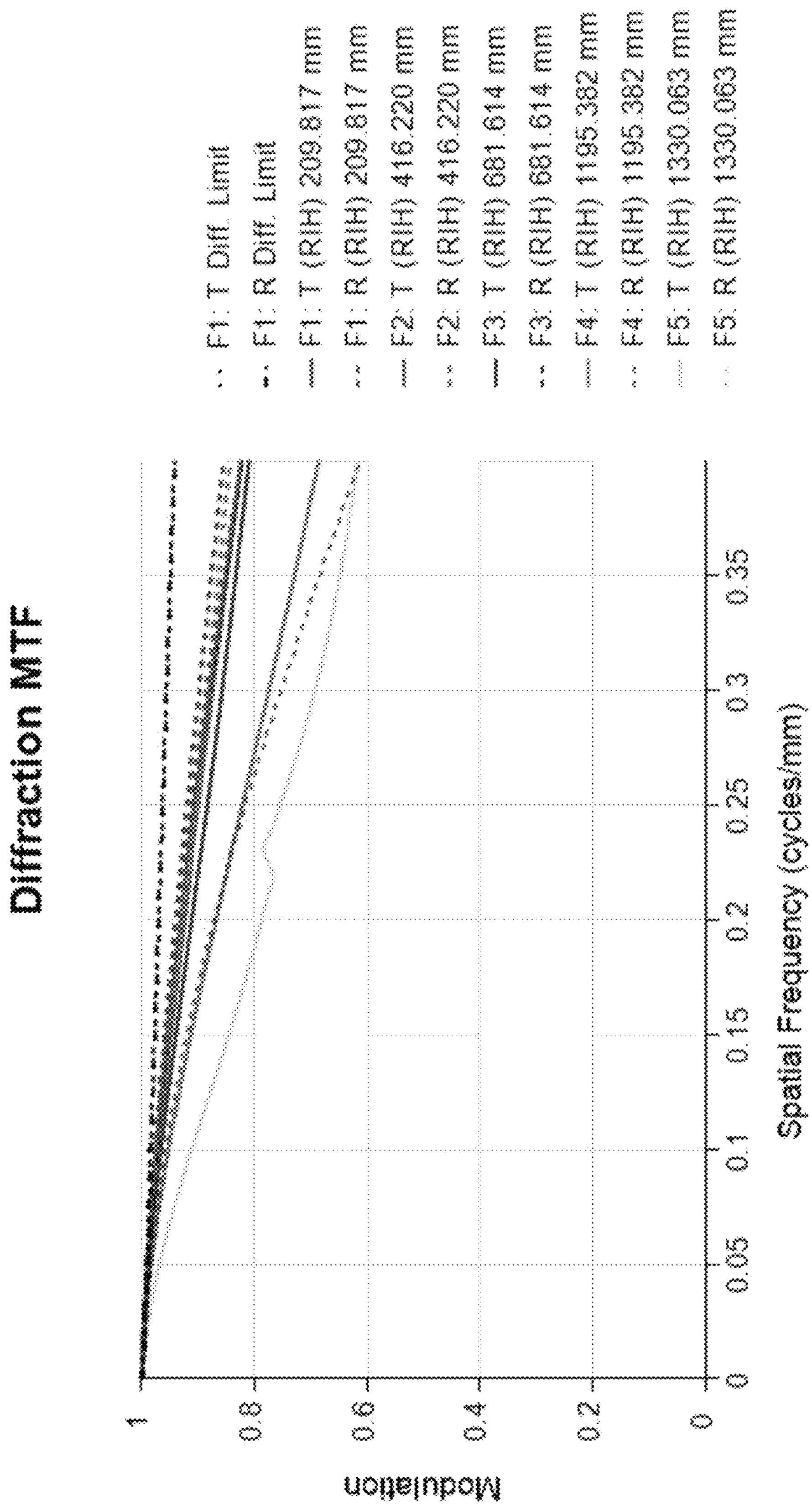
FIG. 4 shows the enlargement-side MTF of the projection system according to Example 1.

FIG. 4 shows the enlargement-side MTF of the projection system 3A. In FIG. 4, the horizontal axis represents the spatial frequency, and the vertical axis represents the contrast reproduction ratio. The projection system 3A according to the present example provides high resolution, as shown in FIG. 4.

Example 2

Figure 5:
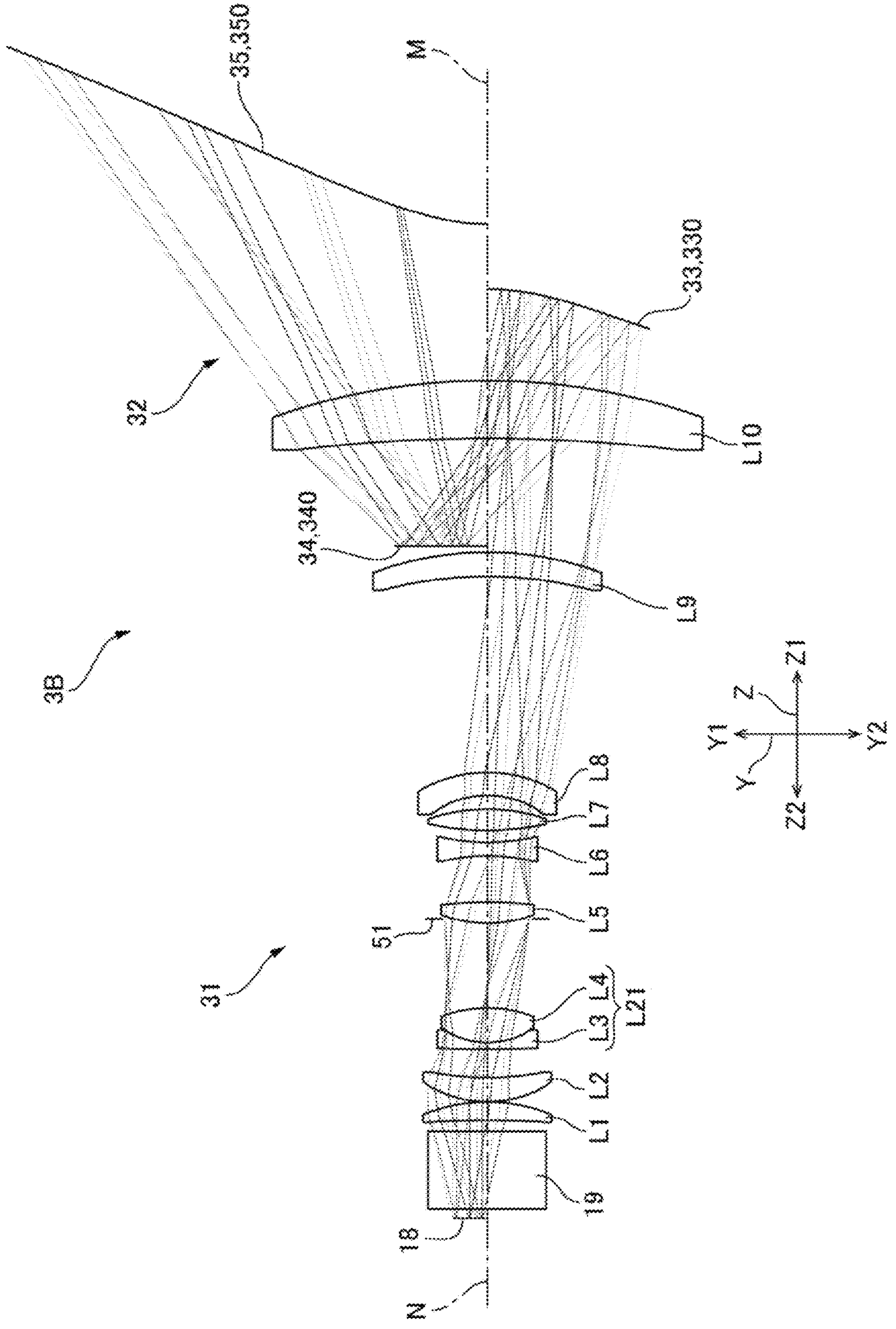
FIG. 5 is a beam diagram showing beams passing through the projection system according to Example 2.

FIG. 5 is a beam diagram showing beams passing through a projection system 3B according to Example 2. The projection system 3B is formed of a first optical system 31 and a second optical system 32 sequentially arranged from the reduction side toward the enlargement side, as shown in FIG. 5. The first optical axis N of the first optical system 31 coincides with the second optical axis M of the second optical system 32.

The first optical system 31 is a refractive optical system having positive power. The first optical system 31 is formed of a plurality of lenses. Specifically, the first optical system 31 is formed of ten lenses L1 to L10. The lenses L1 to L10 are arranged in this order from the reduction side toward the enlargement side. A diaphragm 51 is disposed between the lens L4 and the lens L5.

The lens L1 has positive power. The lens L1 is a meniscus lens. The lens L1 has a concave surface at the reduction side and a convex surface at the enlargement side. The lens L2 has positive power. The lens L2 is a meniscus lens. The lens L2 has a convex surface at the reduction side and a concave surface at the enlargement side.

The lens L3 has negative power. The lens L3 has a convex surface at the reduction side and a concave surface at the enlargement side. The lens L4 has negative power. The lens L4 has convex surfaces both at the reduction and enlargement sides. The lens L3 and the lens L4 are bonded to each other into a cemented doublet L21.

The lens L5 has positive power. The lens L5 has convex surfaces both at the reduction and enlargement sides. The lens L6 has negative power. The lens L6 has concave surfaces both at the reduction and enlargement sides. The lens L7 has positive power. The lens L7 has convex surfaces both at the reduction and enlargement sides.

The lens L8 has negative power. The lens L8 is a meniscus lens. The lens L8 has a concave surface at the reduction side and a convex surface at the enlargement side. The lens L9 (second lens) has positive power. The lens L9 is a meniscus lens. The lens L9 has a concave surface at the reduction side and a convex surface at the enlargement side.

The lens L10 (first lens) has positive power. The lens L10 is a meniscus lens. The lens L10 has a concave surface at the reduction side and a convex surface at the enlargement side. The plurality of lenses L1 to L10, which constitute the first optical system 31, each have a shape rotationally symmetric with respect to the first optical axis N of the first optical system 31 as the axis of rotation.

The second optical system 32 includes a first reflective optical system 33, a second reflective optical system 34, and a third reflective optical system 35, which are sequentially arranged from the side facing the first optical system 31 along the optical path of the beams output from the first optical system 31. The lens L10 is disposed between the first reflective optical system 33 and the second reflective optical system 34 and between the second reflective optical system 34 and the third reflective optical system 35 in the first direction Z1.

The first reflective optical system 33 is disposed at the enlargement side of the first optical system 31. The first reflective optical system 33 is located at the lower side Y2 of the second optical axis M. The first reflective optical system 33 has a first reflection surface 330 having a concave shape. The first reflection surface 330 has an aspherical shape.

The second reflective optical system 34 is disposed on the optical path at the enlargement side of the first reflective optical system 33. The second reflective optical system 34 is located at the upper side Y1 of the second optical axis M. The second reflective optical system 34 has a second reflection surface 340 having a planar shape. The second reflection surface 340 is disposed between the lens L9 and the lens L10 in the first direction 1.

The third reflective optical system 35 is disposed on the optical path at the enlargement side of the second optical system 34. The third reflective optical system 35 is located at the upper side Y1 of the second optical axis M. The third reflective optical system 35 has a third reflection surface 350 having a convex shape. The third reflection surface 350 has an aspherical shape.

The first reflection surface 330, the second reflection surface 340, and the third reflection surface 350, which constitute the second optical system 32, each have a shape rotationally symmetric with respect to the second optical axis M of the second optical system 32 as the axis of rotation.

The beams from the liquid crystal panel 18 pass through the first optical system 31 and the second optical system 32 in this order. Between the first optical system 31 and the second optical system 32, the beams pass through the lower side Y2 of the first optical axis N toward the first reflection surface 330 of the second optical system 32.

The beams having reached the first reflection surface 330 are reflected off the first reflection surface 330 and travels across the first optical axis N toward the upper side Y1 and then in the second direction 22 and towards the upper side Y1. The beams reflected off the first reflection surface 330 pass through the lens L10 and reach the second reflection surface 340. The beams having reached the second reflection surface 340 are reflected in the first direction Z1 and towards the upper side Y1. The beams reflected off the second reflection surface 340 pass through the lens L10 and reach the third reflection surface 350. The beams having reached the third reflection surface 350 are reflected in the second direction 22 and towards the upper side Y1. The beams reflected off the third reflection surface 350 are enlarged by the third reflection surface 350 and reach the screen S.

Let FNo be the f number of the projection system 3B, and ω be the maximum half angle of view of the entire lens system, and data on the projection system 3B according to Example 2 are as follows:

Fno 1.429

ω 80.182°

Data on the lenses of the projection system 3B are listed below. The surfaces of the lenses are numbered sequentially from the reduction side toward the enlargement side. Reference characters are given to the liquid crystal panels, the dichroic prism, the lenses, the first reflection surface, the second reflection surface, the third reflection surface, and the screen. Reference character R represents the radius of curvature. Reference character D represents the axial inter-surface spacing. Reference character nd represents the refractive index. Reference character vd represents the Abbe number. Reference character Y represents the effective radius. Reference characters R, D, and Y are each expressed in millimeters.

| Reference character | Surface number | R | D | nd | vd | Mode | Y |
|---|---|---|---|---|---|---|---|
| 18 | 0 | 0.00000 | 3.000000 | | | Refraction | |
| 19 | 1 | 0.00000 | 25.750000 | 1.516330 | 64.14 | Refraction | 11.623 |
| | 2 | 0.00000 | 3.648092 | | | Refraction | 17.017 |
| L01 | 3 | −250.28858 | 6.000000 | 1.986125 | 16.48 | Refraction | 18.000 |
| | 4 | −49.21333 | 0.100000 | | | Refraction | 18.588 |
| L02 | 5 | 33.51972 | 8.000000 | 1.927010 | 24.64 | Refraction | 18.513 |
| | 6 | 86.85688 | 9.357735 | | | Refraction | 17.288 |
| L03 | 7 | 434.14453 | 2.126957 | 1.986125 | 16.48 | Refraction | 14.319 |
| L04 | 8 | 22.97156 | 11.390743 | 1.459223 | 85.62 | Refraction | 13.131 |
| | 9 | −38.15519 | 27.987780 | | | Refraction | 13.000 |

-continued

| Reference character | Surface number | R | D | nd | vd | Mode | Y |
|---|---|---|---|---|---|---|---|
| 51, L05 | 10 | 39.00070 | 7.000000 | 1.673378 | 52.73 | Refraction | 13.000 |
| | 11 | −113.64727 | 15.328936 | | | Refraction | 13.202 |
| L06 | 12 | −54.49192 | 4.372790 | 1.930507 | 23.90 | Refraction | 13.281 |
| | 13 | 58.30287 | 4.000000 | | | Refraction | 14.243 |
| L07 | 14 | 79.10658 | 7.000000 | 1.843691 | 18.54 | Refraction | 16.577 |
| | 15 | −52.92728 | 4.530482 | | | Refraction | 16.976 |
| L08 | 16 | −27.26682 | 7.589622 | 1.986125 | 16.48 | Refraction | 17.000 |
| | 17 | −39.01552 | 64.695899 | | | Refraction | 20.038 |
| L09 | 18 | −118.25109 | 8.000000 | 1.903700 | 31.30 | Refraction | 32.090 |
| | 19 | −94.77445 | 37.635425 | | | Refraction | 33.538 |
| L10 | 20 | −442.36880 | 19.000000 | 1.804198 | 46.50 | Refraction | 42.522 |
| | 21 | −188.49008 | 30.169182 | | | Refraction | 45.241 |
| 330 | 22* | −65.57949 | −30.169182 | | | Reflection | 47.982 |
| L10 | 23 | −188.49008 | −19.000000 | 1.804198 | 46.50 | Refraction | 33.939 |
| | 24 | −442.36880 | −35.635425 | | | Refraction | 26.789 |
| 340 | 25 | 0.00000 | 35.635425 | | | Reflection | 26.903 |
| L10 | 26 | −442.36880 | 19.000000 | 1.804198 | 46.50 | Refraction | 58.075 |
| | 27 | −188.49008 | 51.551139 | | | Refraction | 63.986 |
| 350 | 28* | 52.78429 | −155.000000 | | | Reflection | 144.673 |
| S | 29 | 0.00000 | 0.000000 | | | Refraction | 1330.167 |

The aspherical coefficients are listed below.

| Surface number | 22 | 28 |
|---|---|---|
| Conic constant | 1.061689E−01 | −4.787871E+00 |
| Fourth-order coefficient | 2.073994E−06 | −2.904389E−08 |
| Sixth-order coefficient | −4.391544E−10 | 1.909389E−12 |
| Eighth-order coefficient | 1.949004E−13 | −8.308591E−17 |
| Tenth-order coefficient | −4.812829E−17 | 2.11295E−21 |
| Twelfth-order coefficient | 7.116146E−21 | −2.328039E−26 |

Let f1 be the focal length of the first reflection surface 330 of the first reflective optical system 33, f2 be the focal length of the second reflection surface 340 of the second reflective optical system 34, and f3 be the focal length of the third reflection surface 350 of the third reflective optical system 35, and data on the projection system 3B according to Example 2 are as follows:

| | | |
|---|---|---|
| f1 | 32.790 | mm |
| f2 | ∞ | mm |
| f3 | −26.392 | mm |

The projection distance of the projection system 3B according to Example 2 is as follows:

Projection distance 155.000 mm

When the focal length of the first reflective optical system is f1, the focal length of the second reflective optical system is f2, and the focal length of the third reflective optical system is f3, the projection system 3B according to the present example satisfies Conditional Expression (1) below.

$$|f2|>|f1|>|f3| \quad (1)$$

In the present example,

| | | |
|---|---|---|
| \|f1\| | 32.790 | mm |
| \|f2\| | ∞ | mm |
| \|f3\| | 26.392 | mm |

are satisfied. The projection system 3B according to the present example therefore satisfies Conditional Expression (1).

Effects and Advantages

In the present example, the plurality of lenses L1 to L10 include the lens L9 disposed on the reduction side of the lens L10. The second reflection surface 340 is disposed between the lens L9 and the lens L10 in the first direction Z1. The second reflection surface 340 is therefore readily positioned when the projection system 3B is incorporated into the projector 1 as compared with the case where the second reflection surface 340 is provided at the enlargement-side lens surface of the lens L9. The second reflection surface 340 has a planar shape. The second reflection surface 340 is therefore readily manufactured.

Figure 6:
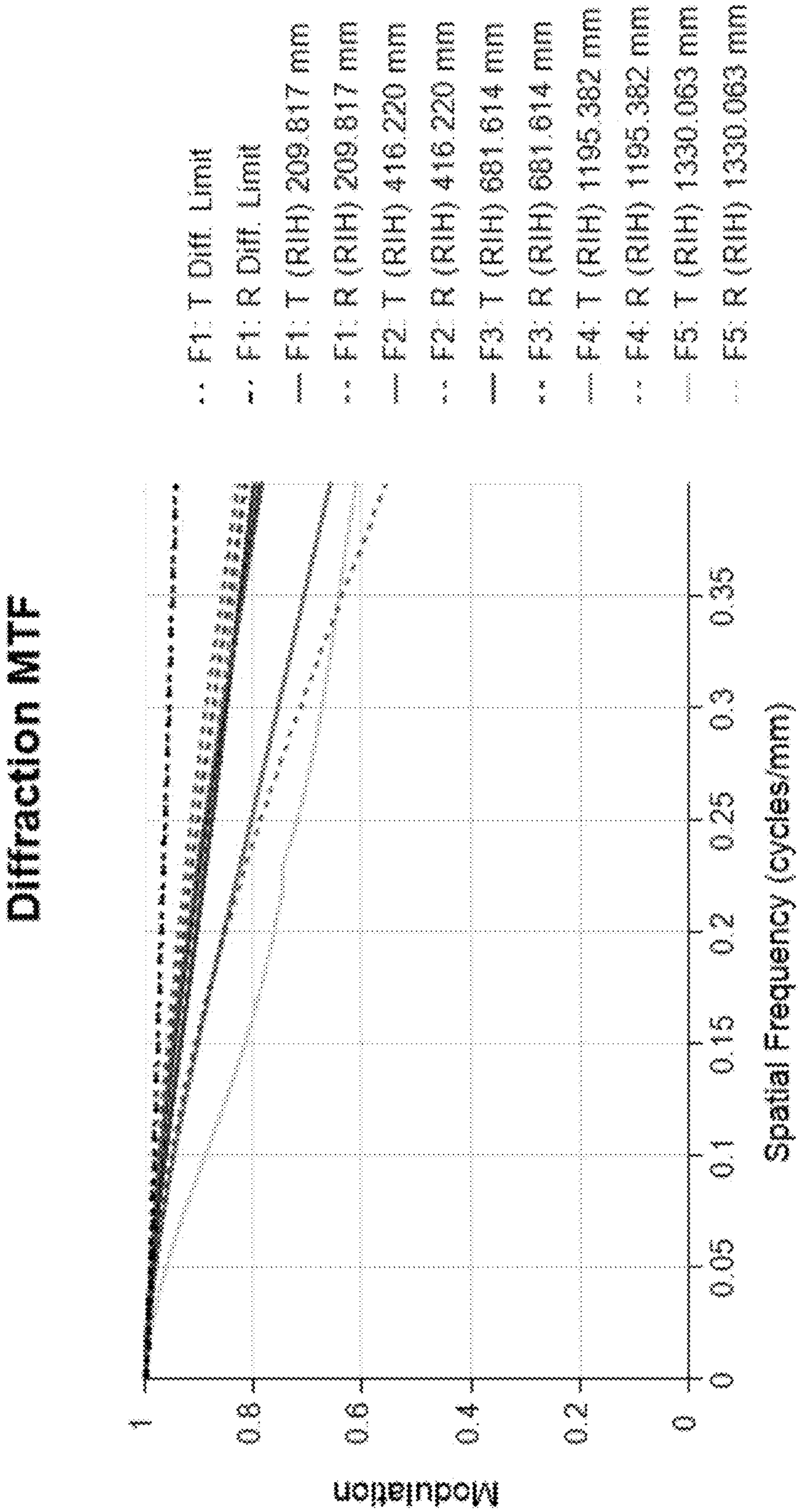
FIG. 6 shows the enlargement-side MTF of the projection system according to Example 2.

The projection system 3B according to the present example, which satisfies Conditional Expression (1), can provide the same effects and advantages as those provided by the projection system 3A according to Example 1. FIG. 6 shows the enlargement-side MTF of the projection system 3B. The projection system 3B according to the present example provides high resolution, as shown in FIG. 6.

Example 3

Figure 7:
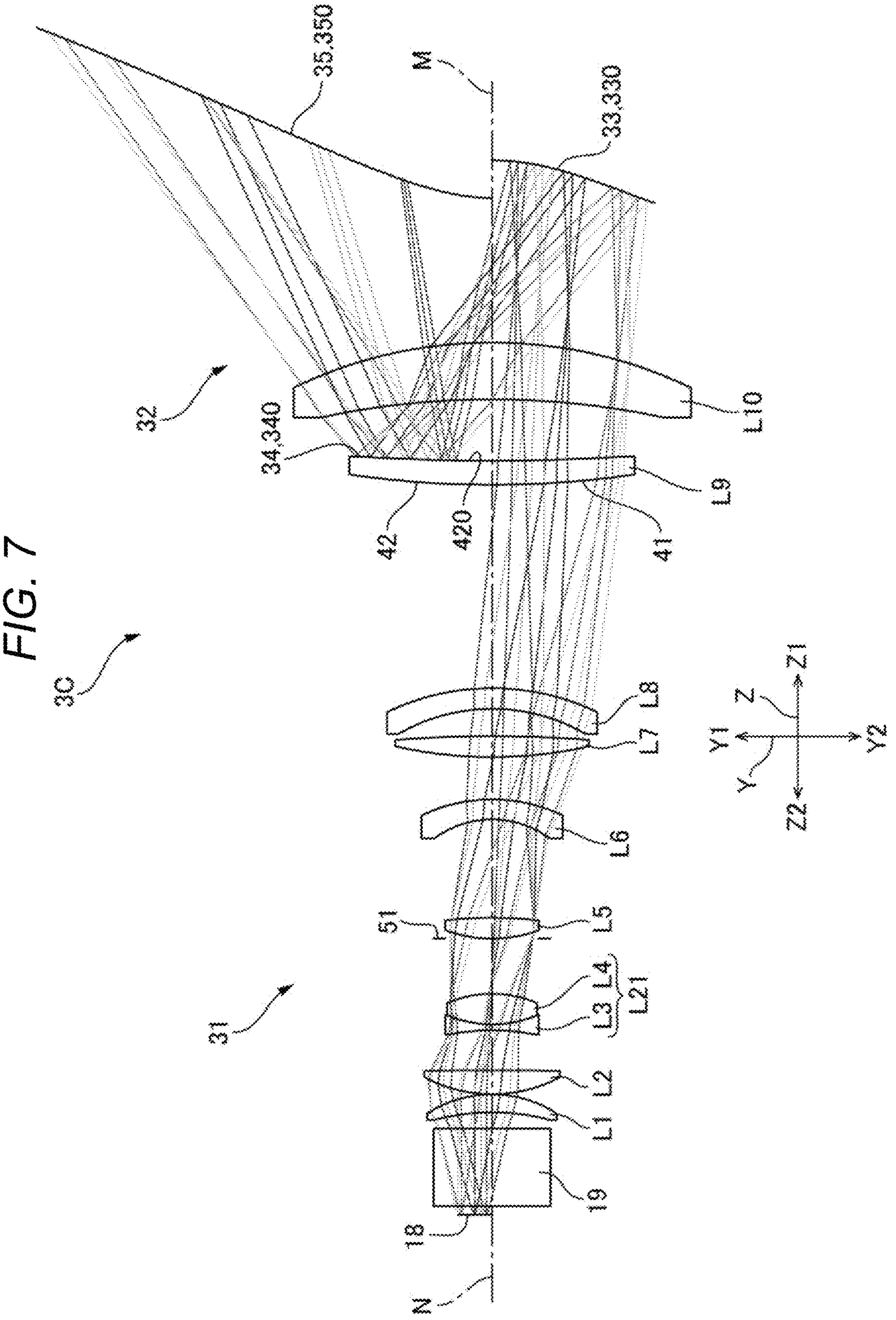
FIG. 7 is a beam diagram showing beams passing through the projection system according to Example 3.

FIG. 7 is a beam diagram showing beams passing through a projection system 3C according to Example 3. The projection system 3C is formed of a first optical system 31 and a second optical system 32 sequentially arranged from the reduction side toward the enlargement side, as shown in FIG. 7. The first optical axis N of the first optical system 31 coincides with the second optical axis M of the second optical system 32.

The first optical system 31 is a refractive optical system having positive power. The first optical system 31 is formed of a plurality of lenses. Specifically, the first optical system 31 is formed of ten lenses L1 to L10. The lenses L1 to L10 are arranged in this order from the reduction side toward the enlargement side. A diaphragm 51 is disposed between the lens L4 and the lens L5.

The lens L1 has positive power. The lens L1 is a meniscus lens. The lens L1 has a concave surface at the reduction side and a convex surface at the enlargement side. The lens L2 has positive power. The lens L2 has convex surfaces both at the reduction and enlargement sides.

The lens L3 has negative power. The lens L3 has concave surfaces both at the reduction and enlargement sides. The lens L4 has positive power. The lens L4 has convex surfaces both at the reduction and enlargement sides. The lens L3 and the lens L4 are bonded to each other into a cemented doublet L21.

The lens L5 has positive power. The lens L5 has convex surfaces both at the reduction and enlargement sides. The lens L6 has negative power. The lens L6 has a concave surface at the reduction side and a convex surface at the enlargement side. The lens L7 has positive power. The lens L7 has convex surfaces both at the reduction and enlargement sides. The lens L8 has negative power. The lens L8 is a meniscus lens. The lens L8 has a concave surface at the reduction side and a convex surface at the enlargement side.

The lens L9 (second lens) has positive power. The lens L9 is a meniscus lens. The lens L9 has a convex surface at the reduction side and a concave surface at the enlargement side. The lens L9 has an aspherical surface at the enlargement side. The lens L9 has a first portion 41 on one side of the first optical axis N and a second portion 42 on the other side thereof. The first portion 41 is a light transmissive portion that functions as part of the first optical system 31. More specifically, the first portion 41 is a light transmissive portion that functions as a refractive lens of the first optical system 31. The second portion 42 is a reflective portion that functions as a second reflection surface 340.

The lens L10 (first lens) has positive power. The lens L10 is a meniscus lens. The lens L10 has a concave surface at the reduction side and a convex surface at the enlargement side. The plurality of lenses L1 to L10, which constitute the first optical system 31, each have a shape rotationally symmetric with respect to the first optical axis N of the first optical system 31 as the axis of rotation.

The second optical system 32 includes a first reflective optical system 33, a second reflective optical system 34, and a third reflective optical system 35, which are sequentially arranged from the side facing the first optical system 31 along the optical path of the beams output from the first optical system 31. The lens L10 is disposed between the first reflective optical system 33 and the second reflective optical system 34 and between the second reflective optical system 34 and the third reflective optical system 35 in the first direction Z1.

The first reflective optical system 33 is disposed at the enlargement side of the first optical system 31. The first reflective optical system 33 is located at the lower side Y2 of the second optical axis M. The first reflective optical system 33 has a first reflection surface 330 having a concave shape. The first reflection surface 330 has an aspherical shape.

The second reflective optical system 34 is disposed on the optical path at the enlargement side of the first reflective optical system 33. The second reflective optical system 34 is located at the upper side Y1 of the second optical axis M. The second reflective optical system 34 has the second reflection surface 340 having a concave shape. The second reflection surface 340 is provided at an enlargement-side lens surface 420 of the second portion 42 of the lens L9. The second reflection surface 340 therefore has an aspherical shape. The second reflection surface 340 is formed of a reflective coating layer provided at the enlargement-side lens surface 420 of the second portion 42.

The third reflective optical system 35 is disposed on the optical path at the enlargement side of the second reflective optical system 34. The third reflective optical system 35 is located at the upper side Y1 of the second optical axis M. The third reflective optical system 35 has a third reflection surface 350 having a convex shape. The third reflection surface 350 has an aspherical shape.

The first reflection surface 330, the second reflection surface 340, and the third reflection surface 350, which constitute the second optical system 32, each have a shape rotationally symmetric with respect to the second optical axis M of the second optical system 32 as the axis of rotation.

The beams from the liquid crystal panel 18 pass through the first optical system 31 and the second optical system 32 in this order. Between the first optical system 31 and the second optical system 32, the beams pass through the lower side Y2 of the first optical axis N toward the first reflection surface 330 of the second optical system 32.

The beams having reached the first reflection surface 330 are reflected off the first reflection surface 330 and travels across the first optical axis N toward the upper side Y1 and then in the second direction 22 and towards the upper side Y1. The beams reflected off the first reflection surface 330 pass through the lens L10 and reach the second reflection surface 340. The beams having reached the second reflection surface 340 are reflected in the first direction Z1 and towards the upper side Y1. The beams reflected off the second reflection surface 340 pass through the lens L10 and reach the third reflection surface 350. The beams having reached the third reflection surface 350 are reflected in the second direction Z2 and towards the upper side Y1. The beams reflected off the third reflection surface 350 are enlarged by the third reflection surface 350 and reach the screen S.

Let FNo be the f number of the projection system 3C, and ω be the maximum half angle of view of the entire lens system, and data on the projection system 3C according to Example 3 are as follows:

Fno 1.433

ω 80.457°

Data on the lenses of the projection system 3C are listed below. The surfaces of the lenses are numbered sequentially from the reduction side toward the enlargement side. Reference characters are given to the liquid crystal panels, the dichroic prism, the lenses, the first reflection surface, the second reflection surface, the third reflection surface, and the screen. Reference character R represents the radius of curvature. Reference character D represents the axial intersurface spacing. Reference character nd represents the refractive index. Reference character νd represents the Abbe number. Reference character Y represents the effective radius. Reference characters R, D, and Y are each expressed in millimeters.

| Reference character | Surface number | R | D | nd | νd | Mode | Y |
|---|---|---|---|---|---|---|---|
| 18 | 0 | 0.00000 | 3.000000 | | | Refraction | |
| 19 | 1 | 0.00000 | 25.750000 | 1.516330 | 64.14 | Refraction | 11.623 |
| | 2 | 0.00000 | 5.500921 | | | Refraction | 17.017 |

-continued

| Reference character | Surface number | R | D | nd | vd | Mode | Y |
|---|---|---|---|---|---|---|---|
| L01 | 3 | −66.02661 | 6.000000 | 1.903658 | 31.32 | Refraction | 18.000 |
| | 4 | −35.31143 | 0.100000 | | | Refraction | 18.985 |
| L02 | 5 | 42.65748 | 8.000000 | 1.969346 | 18.11 | Refraction | 19.852 |
| | 6 | −1169.06825 | 13.341182 | | | Refraction | 19.225 |
| L03 | 7 | −63.97830 | 2.000000 | 1.986125 | 16.48 | Refraction | 13.489 |
| L04 | 8 | 33.87145 | 10.217155 | 1.472590 | 81.12 | Refraction | 12.901 |
| | 9 | −33.17772 | 18.422090 | | | Refraction | 13.000 |
| 51, L05 | 10 | 39.23909 | 7.000000 | 1.438022 | 94.60 | Refraction | 13.000 |
| | 11 | −117.65820 | 32.866322 | | | Refraction | 13.532 |
| L06 | 12 | −28.56052 | 6.702939 | 1.882780 | 33.40 | Refraction | 17.426 |
| | 13 | −47.97692 | 14.148390 | | | Refraction | 20.704 |
| L07 | 14 | 129.72400 | 7.000000 | 1.982136 | 16.81 | Refraction | 28.569 |
| | 15 | −362.02294 | 9.107801 | | | Refraction | 28.703 |
| L08 | 16 | −55.17402 | 6.921911 | 1.986125 | 16.48 | Refraction | 28.746 |
| | 17 | −71.36157 | 67.992188 | | | Refraction | 31.120 |
| L09 | 18 | 289.04180 | 8.000000 | 1.986125 | 16.48 | Refraction | 41.451 |
| | 19* | 461.29891 | 20.572641 | | | Refraction | 41.403 |
| L10 | 20 | −241.32846 | 19.000000 | 1.448364 | 89.89 | Refraction | 41.926 |
| | 21 | −135.63243 | 60.926881 | | | Refraction | 43.245 |
| 330 | 22* | −64.15676 | −60.926881 | | | Reflection | 48.611 |
| L10 | 23 | −135.63243 | −19.000000 | 1.448364 | 89.89 | Refraction | 19.080 |
| | 24 | −241.32846 | −20.572641 | | | Refraction | 26.092 |
| 340 | 25* | 461.29891 | 20.572641 | | | Reflection | 42.654 |
| L10 | 26 | −241.32846 | 19.000000 | 1.448364 | 89.89 | Refraction | 53.351 |
| | 27 | −135.63243 | 48.356460 | | | Refraction | 59.878 |
| 350 | 28* | 53.00842 | −155.000000 | | | Reflection | 138.968 |
| S | 29 | 0.00000 | 0.000000 | | | Refraction | 1330.080 |

The aspherical coefficients are listed below.

| Surface number | 19 | 22 | 25 | 28 |
|---|---|---|---|---|
| Conic constant | 6.166722E+01 | 3.383186E−02 | 6.166722E+01 | −4.559562E+00 |
| Fourth-order coefficient | −3.115222E−07 | 1.809685E−06 | −3.115222E−07 | −3.095255E−08 |
| Sixth-order coefficient | 5.312844E−11 | −3.658264E−10 | 5.312844E−11 | 1.835285E−12 |
| Eighth-order coefficient | −1.756324E−14 | 2.037076E−13 | −1.756324E−14 | −7. 421759E−17 |
| Tenth-order coefficient | | −5.418827E−17 | | 1.78666E−21 |
| Twelfth-order coefficient | | 7.93418E−21 | | −1.910778E−26 |

Let f1 be the focal length of the first reflection surface 330 of the first reflective optical system 33, f2 be the focal length of the second reflection surface 340 of the second reflective optical system 34, and f3 be the focal length of the third reflection surface 350 of the third reflective optical system 35, and data on the projection system 3C according to Example 3 are as follows:

| | |
|---|---|
| f1 | 32.078 mm |
| f2 | 230.649 mm |
| f3 | −26.504 mm |

The projection distance of the projection system 3C according to Example 3 is as follows:

Projection distance 155.000 mm

When the focal length of the first reflective optical system is f1, the focal length of the second reflective optical system is f2, and the focal length of the third reflective optical system is f3, the projection system 3C according to the present example satisfies Conditional Expression (1) below.

$$|f2|>|f1|>|f3| \quad (1)$$

In the present example,

| | |
|---|---|
| \|f1\| | 32.078 mm |
| \|f2\| | 230.649 mm |
| \|f3\| | 26.504 mm |

are satisfied. The projection system 3C according to the present example therefore satisfies Conditional Expression (1).

Effects and Advantages

In the present example, the second reflection surface 340 has an aspherical shape. The variety of aberrations produced by the projection system 3C can therefore be more satisfactorily corrected.

Figure 8:
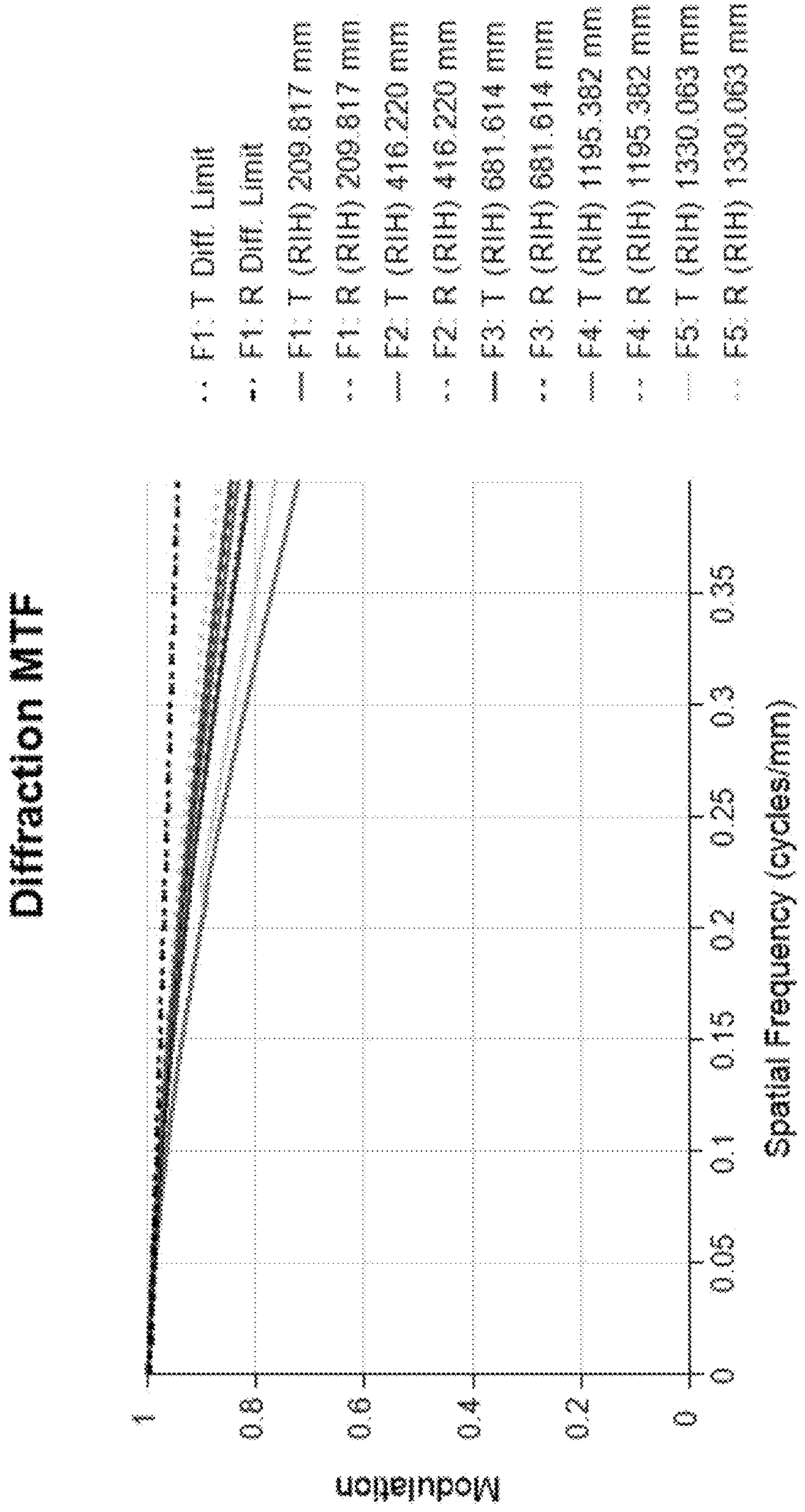
FIG. 8 shows the enlargement-side MTF of the projection system according to Example 3.

The projection system 3C according to the present example, which satisfies Conditional Expression (1), can provide the same effects and advantages as those provided by the projection system 3A according to Example 1. FIG. 8 shows the enlargement-side MTF of the projection system 3C. The projection system 3C according to the present example provides high resolution, as shown in FIG. 8.

Other Examples

The aforementioned examples have been described with reference to the case where the first reflection surface 330 and the third reflection surface 350 are separate members, but one member may have the first reflection surface 330 and the third reflection surface 350.

Summary of Present Disclosure

The present disclosure will be summarized below as additional remarks.

Additional Remark 1

A projection system including a first optical system and a second optical system sequentially arranged from the reduction side toward the enlargement side, the first optical system formed of a plurality of lenses, the first optical system having positive power, the second optical system including a first reflective optical system, a second reflective optical system, and a third reflective optical system sequentially arranged from the side facing the first optical system along the optical path of beams output from the first optical system, the first reflective optical system having a first reflection surface having a concave aspherical shape, the second reflective optical system having a second reflection surface having a concave shape or a planar shape, the third reflective optical system having a third reflection surface having a convex aspherical shape, the projection system satisfying Conditional Expression (1) below $$|f2|>|f1|>|f3| \quad (1)$$

where f1 represents the focal length of the first reflective optical system, f2 represents the focal length of the second reflective optical system, and f3 represents the focal length of the third reflective optical system.

The projection system, which satisfies Conditional Expression (1), can have a short projection distance. That is, employing the configuration in which the absolute value of the focal length f3 of the third reflection surface is smaller than the absolute value of the focal length f1 of the first reflection surface and the absolute value of the focal length f2 of the second reflection surface allows a large increase in the angle of reflection of the beams reflected off the third reflection surface, so that the projection distance of the projection system can be shortened.

Additional Remark 2

The projection system described in the additional remark 1, in which the maximum effective radius of the third reflection surface is smaller than 150 mm.

The third reflection surface can thus be processed with increased processing precision. The projection system can thus project a sharp enlarged image onto a screen.

Additional Remark 3

The projection system described in the additional remark 1 or 2, in which the plurality of lenses include a first lens having positive power and disposed at a position closest to the enlargement side, the first lens is disposed between the first reflective optical system and the second reflective optical system in a first direction along a first optical axis of the first optical system, and the beams reflected off the first reflective optical system pass through the first lens and reach the second reflective optical system.

The beams reflected off the first reflection surface can therefore be controlled by the first lens in terms of the amount of spread of the beams and the magnitude of the angle thereof, so that the axial inter-surface spacing between the first reflection surface and the second reflection surface can b be reduced. Furthermore, the first lens can satisfactorily correct a variety of aberrations that affect the beams reflected off the first reflection surface.

Additional Remark 4

The projection system described in the additional remark 3, in which the first lens is disposed between the second reflective optical system and the third reflective optical system in the first direction, and the beams reflected off the second reflective optical system pass through the first lens and reach the third reflective optical system.

The beams reflected off the second reflection surface can therefore be controlled by the first lens in terms of the amount of spread of the beams and the magnitude of the angle thereof, so that the axial inter-surface spacing between the second reflection surface and the third reflection surface can be reduced. Furthermore, the first lens can satisfactorily correct the variety of aberrations that affect the beams reflected off the second reflection surface.

Additional Remark 5

The projection system described in the additional remark 3 or 4, in which the plurality of lenses include a second lens disposed on the reduction side of the first lens, the second lens has a first portion on one side of the first optical axis and a second portion on the other side thereof, the first portion is a light transmissive portion that functions as part of the first optical system, and the second portion is a reflective portion that functions as the second reflection surface.

The second lens therefore functions both as a refractive lens and the second reflection surface, so that the number of optical parts can be reduced, and the configuration of the projection system can be simplified.

Additional Remark 6

The projection system described in the additional remark 3 or 4, in which the plurality of lenses include a second lens disposed on the reduction side of the first lens, and the second reflection surface is disposed between the first lens and the second lens in the first direction.

The second reflection surface is therefore readily positioned when the second reflection surface is placed in the projection system as compared with a case where the second reflection surface is provided at the second lens.

Additional Remark 7

The projection system described in any one of the additional remarks 3 to 6, in which the plurality of lenses each have a shape rotationally symmetric with respect to the first optical axis as the axis of rotation.

The lenses of the first optical system are thus each readily manufactured. Furthermore, the lenses of the first optical system are readily placed with precision.

Additional Remark 8

The projection system described in the additional remark 7, in which the first reflection surface, the second reflection surface, and the third reflection surface each have a shape rotationally symmetric with respect to a second optical axis of the second optical system as the axis of rotation.

The reflection surfaces of the second optical system are thus each readily manufactured. Furthermore, the reflection surfaces of the second optical system are readily placed with precision.

Additional Remark 9

The projection system described in the additional remark 8, in which the first optical axis and the second optical axis coincide with each other.

The first optical system and the second optical system are thus readily placed with precision.

Additional Remark 10

A projector including the projection system according to any one of the additional remarks 1 to 9, and an image formation unit that forms a projection image in a reduction-side image formation plane of the projection system.

What is claimed is:

1. A projection system comprising:

a first optical system and a second optical system sequentially arranged from a reduction side toward an enlargement side, the first optical system formed of a plurality of lenses, wherein the first optical system has positive power, the second optical system includes a first reflective optical system, a second reflective optical system, and a third reflective optical system sequentially arranged from a side facing the first optical system along an optical path of beams output from the first optical system, the first reflective optical system has a first reflection surface having a concave aspherical shape, the second reflective optical system has a second reflection surface having a concave shape or a planar shape, the third reflective optical system has a third reflection surface having a convex aspherical shape, and the projection system satisfies Conditional Expression (1) below $$|f2|>|f1|>|f3| \quad (1)$$

where f1 represents a focal length of the first reflective optical system, f2 represents a focal length of the second reflective optical system, and f3 represents a focal length of the third reflective optical system, the plurality of lenses include a first lens having positive power and disposed at a position closest to the enlargement side, the first lens is disposed between the first reflective optical system and the second reflective optical system in a first direction along a first optical axis of the first optical system, and the beams reflected off the first reflective optical system pass through the first lens and reach the second reflective optical system, the first lens is disposed between the second reflective optical system and the third reflective optical system in the first direction, and the beams reflected off the second reflective optical system pass through the first lens and reach the third reflective optical system.

2. The projection system according to claim 1, wherein a maximum effective radius of the third reflection surface is smaller than 150 mm.

3. The projection system according to claim 1, wherein the plurality of lenses each have a shape rotationally symmetric with respect to the first optical axis as an axis of rotation.

4. The projection system according to claim 3, wherein the first reflection surface, the second reflection surface, and the third reflection surface are each arranged around a second optical axis of the second optical system as an axis of rotation.

5. The projection system according to claim 4, wherein the first optical axis and the second optical axis coincide with each other.

6. A projector comprising:

the projection system according to claim 1; and an image formation unit that forms a projection image in a reduction-side image formation plane of the projection system.

7. A projection system comprising:

a first optical system and a second optical system sequentially arranged from a reduction side toward an enlargement side, the first optical system formed of a plurality of lenses, wherein the first optical system has positive power, the second optical system includes a first reflective optical system, a second reflective optical system, and a third reflective optical system sequentially arranged from a side facing the first optical system along an optical path of beams output from the first optical system, the first reflective optical system has a first reflection surface having a concave aspherical shape, the second reflective optical system has a second reflection surface having a concave shape or a planar shape, the third reflective optical system has a third reflection surface having a convex aspherical shape, and the projection system satisfies Conditional Expression (1) below $$f2|>|f1|>|f3| \quad (1)$$

where f1 represents a focal length of the first reflective optical system, f2 represents a focal length of the second reflective optical system, and f3 represents a focal length of the third reflective optical system, wherein the plurality of lenses include a first lens having positive power and disposed at a position closest to the enlargement side, the first lens is disposed between the first reflective optical system and the second reflective optical system in a first direction along a first optical axis of the first optical system, and the beams reflected off the first reflective optical system pass through the first lens and reach the second reflective optical system, wherein the plurality of lenses include a second lens disposed on the reduction side of the first lens, the second lens has a first portion on one side of the first optical axis and a second portion on another side thereof, the first portion is a light transmissive portion that functions as part of the first optical system, and the second portion is a reflective portion that functions as the second reflection surface.

8. A projection system comprising:

a first optical system and a second optical system sequentially arranged from a reduction side toward an enlargement side, the first optical system formed of a plurality of lenses, wherein the first optical system has positive power, the second optical system includes a first reflective optical system, a second reflective optical system, and a third reflective optical system sequentially arranged from a side facing the first optical system along an optical path of beams output from the first optical system, the first reflective optical system has a first reflection surface having a concave aspherical shape, the second reflective optical system has a second reflection surface having a concave shape or a planar shape, the third reflective optical system has a third reflection surface having a convex aspherical shape, and the projection system satisfies Conditional Expression (1) below $$f2|>|f1|>|f3| \quad (1)$$

where f1 represents a focal length of the first reflective optical system, f2 represents a focal length of the second reflective optical system, and f3 represents a focal length of the third reflective optical system, wherein the plurality of lenses include a first lens having positive power and disposed at a position closest to the enlargement side, the first lens is disposed between the first reflective optical system and the second reflective optical system in a first direction along a first optical axis of the first optical system, and the beams reflected off the first reflective optical system pass through the first lens and reach the second reflective optical system, wherein the plurality of lenses include a second lens disposed on the reduction side of the first lens, and the second reflection surface is disposed between the first lens and the second lens in the first direction.

* * * * *